(12) United States Patent
Kramp et al.

(10) Patent No.: US 7,654,424 B1
(45) Date of Patent: Feb. 2, 2010

(54) ALL TERRAIN VEHICLE UTILITY STORAGE BOX

(76) Inventors: David W. Kramp, 6822 Overland Dr., Colorado Springs, CO (US) 80919; Kelly G. Kramp, HC01, Box 190, Gakona, AK (US) 99586

( * ) Notice: Subject to any disclaimer, the term of this patent is extended or adjusted under 35 U.S.C. 154(b) by 710 days.

(21) Appl. No.: 11/433,605

(22) Filed: May 15, 2006

(51) Int. Cl.
*B60R 7/00* (2006.01)
*B60R 9/00* (2006.01)
*B60R 5/00* (2006.01)
*B62D 61/06* (2006.01)

(52) U.S. Cl. .................. 224/401; 224/405; 224/488; 224/492; 224/494; 224/545; 296/37.1; 180/210

(58) Field of Classification Search ............. 224/401, 224/488, 545, 405, 494, 492; 182/127; 296/37.1; 180/210, 908, 312
See application file for complete search history.

(56) References Cited

U.S. PATENT DOCUMENTS 6,910,492 B1 * 6/2005 Stuck .................. 135/88.15

* cited by examiner

*Primary Examiner*—Nathan J Newhouse
*Assistant Examiner*—Lester L Vanterpool
(74) *Attorney, Agent, or Firm*—G. F. Gallinger

(57) ABSTRACT

A method of carrying equipment on one side of an ATV having a front top rack, a rear top rack and a foot rest on the one side comprising the following steps: a) attaching a utility box carrying bracket to an outer side portion of the front top rack, the foot rest, and the rear top rack; and, b) mounting a utility box on each of the box carrying brackets. Then equipment may be conveniently carried in and removed from the mounted box. In a preferred aspect of this invention the utility box is generally rectangular in plan view and further comprises a utility box lid hinged to one long top side portion of the box and latched to the other opposite long side portion of the box so that equipment carried in the box is protected from the elements. A lateral side of the mounted box is dimensioned to generally follow the longitudinal shape of the fenders and running board so that the box generally fills the void above the running board and a central portion of the fenders.

11 Claims, 2 Drawing Sheets

ALL TERRAIN VEHICLE UTILITY STORAGE BOX

FIELD OF THE INVENTION

This invention relates to carrying sports equipment and supplies on an all terrain vehicle, hereinafter referred to as an ATV. More particularly this invention relates to a method for the design and mounting of a utility storage box used to carry sports equipment and supplies on an ATV.

BACKGROUND OF THE INVENTION

Sportsmen use ATV's for off road excursions. When they do so it is usually necessary to carry fishing, hunting, camping or some other type of gear as well as food and possibly tools. ATV's do not have any built in storage compartment. Typically they are fitted only with storage racks. These racks bounce around with the ATV and they are not very satisfactory for small paraphernalia or equipment which must be kept clean and dry. Another problem with the storage racks is that they have limited and usually insufficient capacity to carry all of the equipment which a user desires to carry. Another problem with these storage racks is that it is time consuming to securely initially strap, subsequently unstrap for use, and then restrap all equipment back to these racks. Yet another problem with these storage racks is that valuable equipment strapped thereto is prominently displayed for, and generally inadequately secured against theft. There is a great need for an auxiliary storage compartment which can enclose equipment from the elements. There is also a need for an auxiliary storage compartment which can be readily installed on, and then removed from an ATV after a longer excursion.

OBJECTS OF THE INVENTION

It is an object of this invention to disclose a storage compartment for an ATV which can conveniently enclose and shield small paraphernalia and equipment from the elements. It is an object of this invention to disclose a convenient means of carrying equipment on an ATV. It is yet a further object of this invention to disclose a utility storage box for an ATV which can be conveniently attached or removed from the ATV. It is a final object of this invention to disclose a method of carrying equipment on an ATV which facilitates quick convenient selective access to that equipment without the necessity of unwrapping and repackaging and securing that equipment after it has been used.

One aspect of this invention provides for a method of carrying equipment on one side of an ATV having a front top rack, a rear top rack and a foot rest on the one side comprising the following steps: a) attaching a utility box carrying bracket to an outer side portion of the front top rack, the foot rest, and the rear top rack; and, b) mounting a utility box on each of the box carrying brackets. Then equipment may be conveniently carried in and removed from the mounted box.

In a preferred aspect of this invention the utility box is generally rectangular in plan view and further comprises a utility box lid hinged to one long top side portion of the box and latched to the other opposite long side portion of the box so that equipment carried in the box is protected from the elements. A lateral side of the mounted box is dimensioned to generally follow the longitudinal shape of the fenders and running board so that the box generally fills the void above the running board and a central portion of the fenders.

Various other objects, advantages and features of this invention will become apparent to those skilled in the art from the following description in conjunction with the accompanying drawings.

FIGURES OF THE INVENTION

Figure 1:
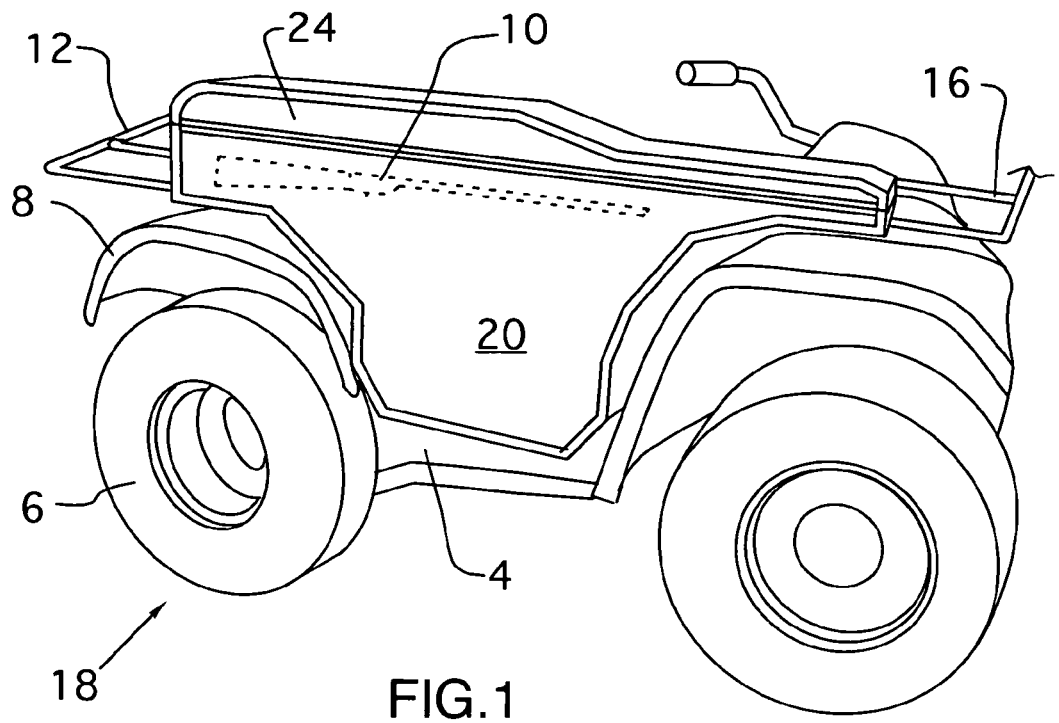
FIG. 1 is an perspective elevational view of an ATV fitted with the utility storage box.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have an perspective elevational view of an ATV 18 fitted with the utility storage box 20. Most generally, a method of carrying equipment on one side of an ATV 18 having a front top rack 16, a footrest 14 and, a rear top rack 12 on the one side comprising the following steps: a) attaching a utility box carrying bracket 22 to an outer side portion of the front top rack 16, the foot rest 14, and the rear top rack 12; and, b) mounting a utility box 20 on each of the box carrying brackets 22. Then equipment 10 may be conveniently carried in and removed from the mounted box 20.

Figure 2:
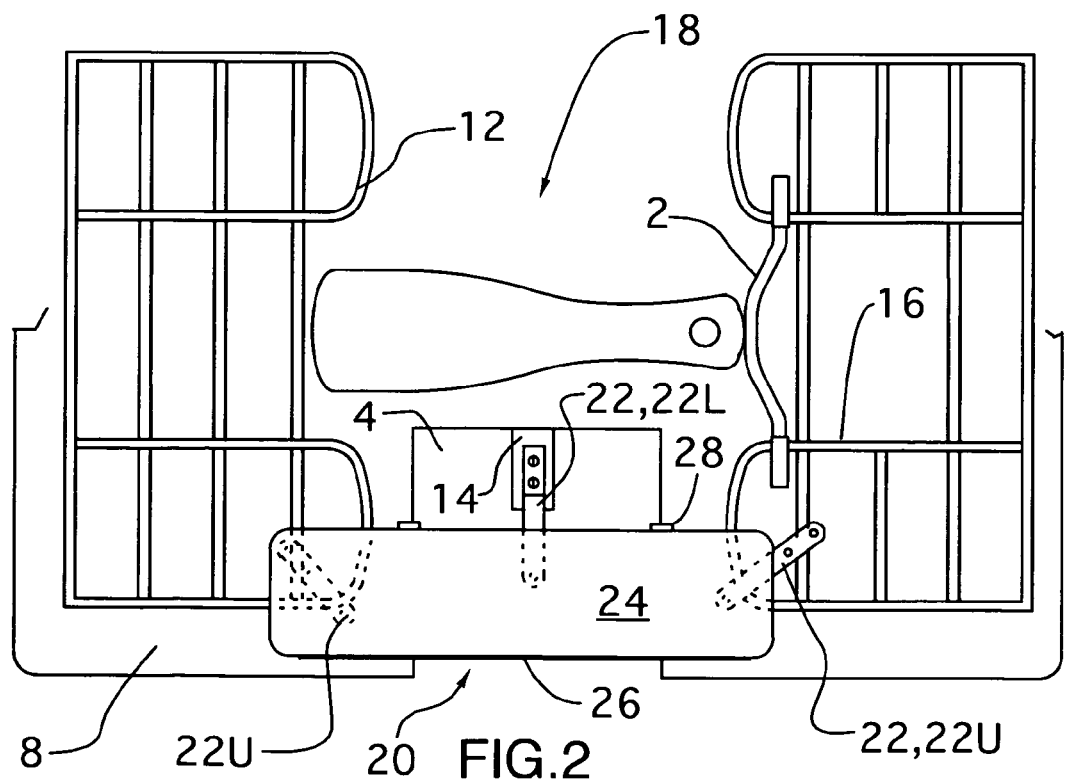
FIG. 2 is a plan view of the ATV shown in FIG. 1.

FIG. 2 is a plan view of the ATV shown in FIG. 1. Most preferably, the utility box 20 is generally rectangular in plan view and further comprises a utility box lid 24 hinged to one long top side portion of the box and latched 28 to the other opposite long side portion of the box 20 so that equipment 10 carried therein is protected from the elements. Most preferably, the ATV 18 has fenders 8 covering a top side portion of its wheels 6 and wherein the width of the mounted box 20 is limited so that it does not extend beyond an outer side portion of the fenders 8.

Referring back to FIG. 1 it can be seen that the ATV has a running board 4 extending generally horizontally between a bottom side portion of its front and rear fenders 8. Most preferably a lateral side of the mounted box 20 is dimensioned to generally follow a profile of the fenders 8 and the running board 4 so that the box 20 profile generally fills the void above the running board 4 and between the fenders 8. Most preferably the lid 24 of the box 20 has a substantial depth and a front portion of the lid 24 has a reduced depth to provide adequate clearance for a handle bar 2 on the ATV to turn and swing over the front portion of the lid 24. A security lock (not shown) may be provided on the latch 28. In the most preferred embodiment of the invention the utility box is fabricated from sheet aluminum to thereby ensure minimal weight and resistance against corrosion.

Figure 3:
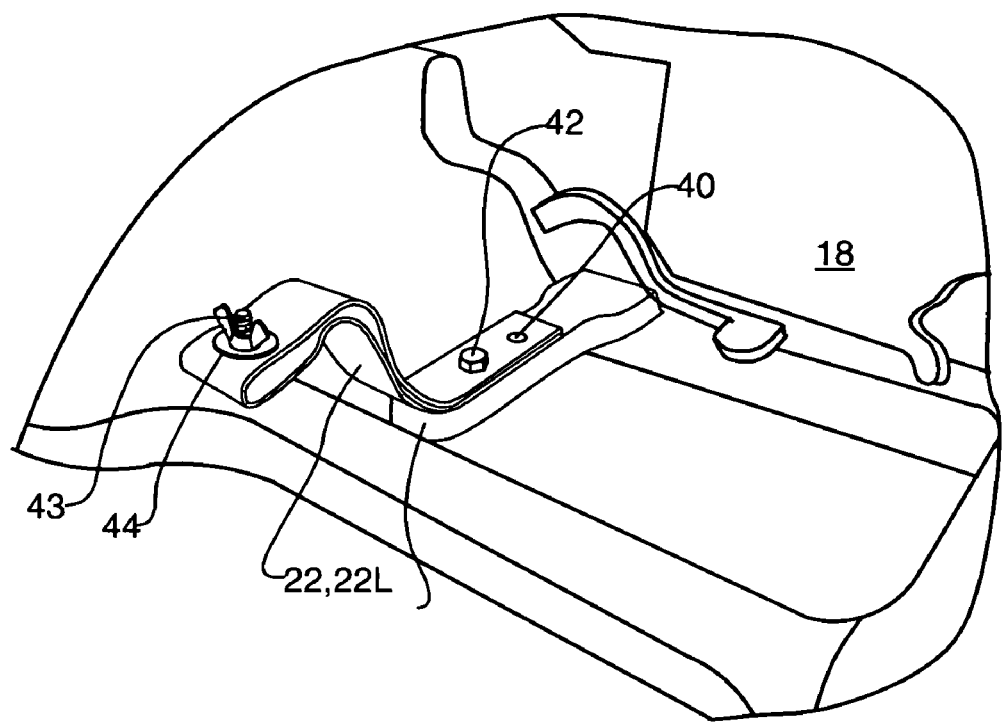
FIG. 3 is a perspective view of the lower bracket shown in FIG. 3 attached to a footrest on the ATV.

FIG. 3 is a perspective view of the lower carrying bracket 22L shown in FIG. 3 attached to a foot rest 12 on the ATV 18. In the most preferred embodiment of the invention an inner end portion of the lower carrying bracket 22 is bolted to the footrest through vertical holes 40 drilled therethrough and wherein a bottom side portion of the utility box 20 is bolted 42 to, and seats on an outer end portion of the lower carrying bracket 22L.

Figure 4:
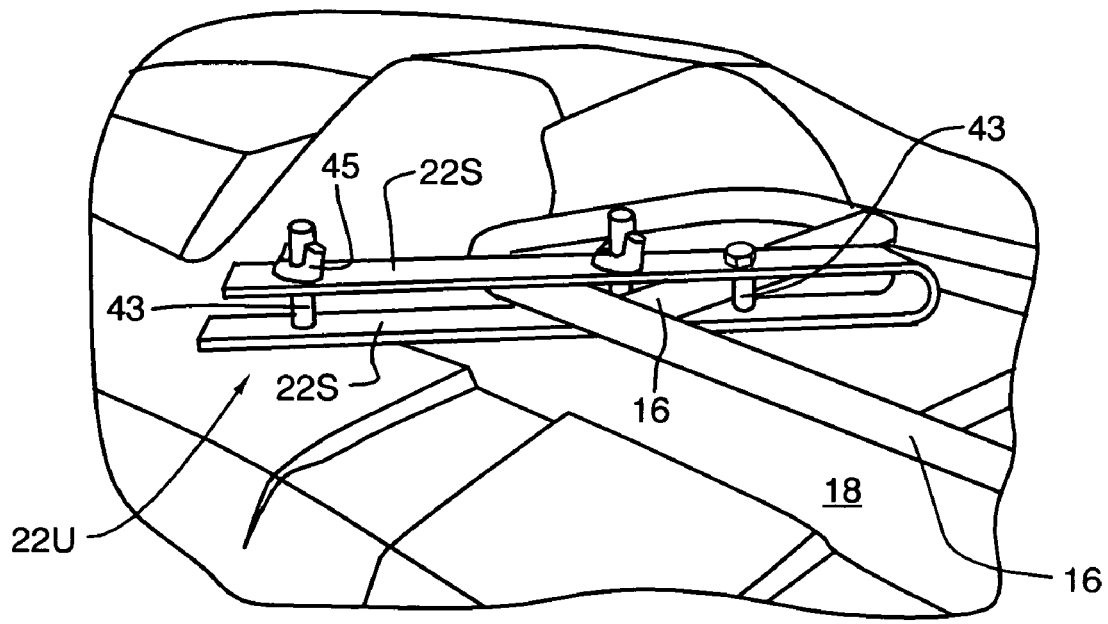
FIG. 4 is a perspective view of the upper bracket shown in FIG. 3 attached to a front rack on the ATV. The front rack bracket is obliquely attached surrounding a lateral member and a longitudinal side member of the rack and is similar in both configuration and attachment to the rear bracket shown in FIG. 2.

FIG. 4 is a perspective view of the upper bracket 22U shown in FIG. 3 attached to the front top rack 16 on the ATV. The front rack bracket 22U is obliquely attached surrounding a lateral member and a longitudinal side member of the rack 16 and is similar in both configuration and attachment to the rear bracket 22U shown in FIG. 2. In the most preferred embodiment of the invention the utility box carrying brackets 22U attached to the outer side portion of the front and rear top rack comprise a top and bottom rack side portion 22S. A longitudinal and lateral cross member of the rack 16 are positioned between the top and bottom rack side portions 22S. The rack bracket 22U thereby secures the rack by bolts 42 which squeeze the bracket side portions 22S around the members of the rack 16. After mounting brackets 22U,22L are mounted on the ATV 18, a bottom side portion of the utility box 20 is bolted to, and seats on an outer end portion of the members of the rack 16. In the most preferred embodiment of the invention the utility box 20 is secured on the carrying brackets 22U,22L with carriage bolts 43, flat washers 44, and wing nuts 45 to facilitate quick installation of the utility box 20 on the ATV 18 when needed, and removal therefrom when not needed.

The utility box 20 has been built for a Honda ATV 18. The rectangular top portion is 53" long by 7" wide. A central portion of the box 20, positioned above the foot rest is 20" high. The height of the rear end portion of the box, 20 above the rear fender is 6" in height, whereas the front end portion, above the front fender is as little as 1½" in height. The height of the front portion of the lid, beneath the handlebar is generally 1½" in height, whereas a central and rear portion of the lid are generally 3" in height.

While the invention has been described with preferred specific embodiments thereof, it will be understood that this description is intended to illustrate and not to limit the scope of the invention, which is defined by the following claims.

We claim:

1. A method of carrying equipment on one side of an ATV having a front top rack, a rear top rack, and a foot rest on the one side thereof comprising the following steps:
   a) attaching a utility box carrying member to one and only one lateral side portion of an outer side portion of the front top rack, and the rear top rack;
   b) attaching a utility box carrying bracket directly to the foot rest of the ATV and,
   c) mounting a utility box on each of the box carrying members and the box carrying bracket;
   so that equipment may be conveniently carried in and removed from the mounted box.

2. A method of carrying equipment on one side of an ATV having a front top rack, a rear top rack and a foot rest on the one side comprising the following steps:
   a) attaching a utility box carrying bracket to an outer side portion of the front top rack, the foot rest, and the rear top rack; and,
   b) mounting a utility box on each of the box carrying brackets;
   so that equipment may be conveniently carried in and removed from the mounted box.

3. A method as in claim 2 wherein the step of mounting a utility box on each of the box carrying brackets comprises using a utility box which is generally rectangular in plan view and hinging a utility box lid to one long top side portion of the box and latching the lid to other opposite long side portion of the box so that equipment carried in the box is protected from the elements.

4. A method as in claim 3 wherein the step of hinging a utility box lid comprises the step of positioning the hinges on an outer long side of the box so that equipment therein is maximally accessible to a user seated on the ATV.

5. A method as in claim 3 wherein the ATV on which the equipment is carried has fenders covering a top side portion of its wheels and wherein the step of mounting the utility box further comprises the step of selecting and limiting the width of the mounted box so that it does not extend beyond an outer side portion of the fenders.

6. A method as in claim 3 wherein the ATV on which the equipment is carried has a running board extending generally horizontally between a bottom side portion of its front and rear fenders and wherein the step of mounting the utility box further comprises the step of ensuring that a lateral side of the mounted box is dimensioned to generally follow a profile of the fenders and the running board so that the box generally fills the void above the running board and between the fenders.

7. A method as in claim 3 wherein the lid of the box has a substantial depth and further comprising the step of ensuring that a front portion of the lid has a reduced depth to provide adequate clearance for a handle bar on the ATV to turn and swing over the front portion of the lid.

8. A method as in claim 3 further comprising the step of fabricating the utility box from sheet aluminum to thereby ensure minimal weight and resistance against corrosion.

9. A method as in claim 2 further comprising the steps of drilling vertical holes through the footrest, bolting an inner end portion of the lower carrying bracket to the foot rest through vertical holes drilled therethrough, then bolting and seating a bottom side portion of the utility box to and on an outer end portion of the lower carrying bracket.

10. A method as in claim 9 further comprising the step of providing utility box carrying brackets comprising a top and bottom rack side portion, and positioning a longitudinal and lateral cross member of the rack between the top and bottom rack side portions of the bracket, then using bolts to squeeze and secure the side portions of the bracket around the members of the rack, and whereafter mounting the brackets on the ATV, seating and bolting a bottom side portion of the utility box on the mounted brackets.

11. A method as in claim 10 further comprising the step of providing carriage bolts, flat washers, and wing nuts to facilitate quick installation and removal of the utility box from the carrying brackets on the ATV.

* * * * *